United States Patent Office.

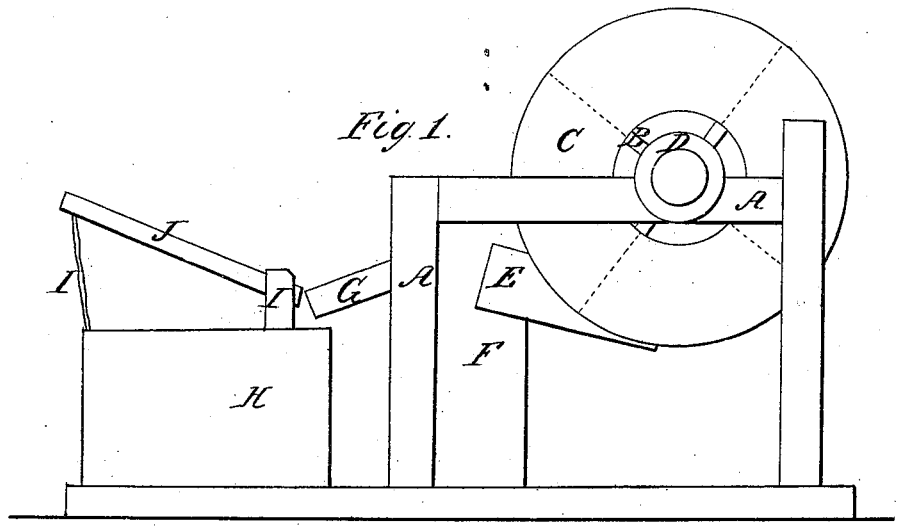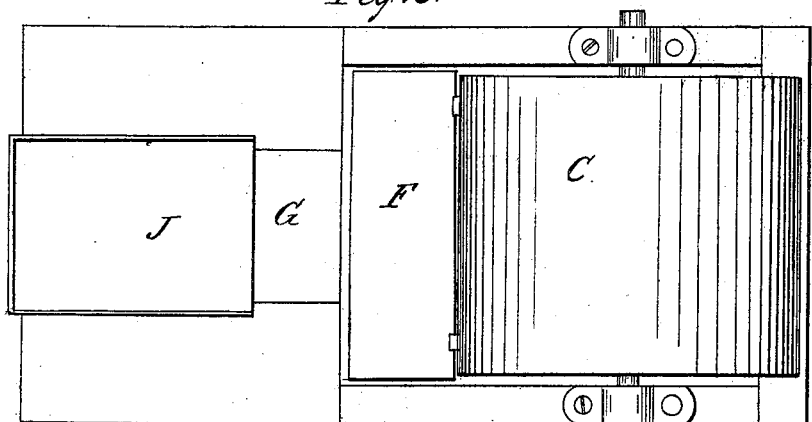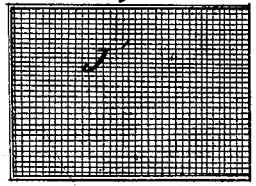

ALEXANDER OSBORN, OF EAGLEVILLE, OHIO.

*Letters Patent No. 95,719, dated October 12, 1869.*

IMPROVEMENT IN MILK-COOLERS AND DEODORIZERS.

The Schedule referred to in these Letters Patent and making part of the same

*To all whom it may concern:*

Be it known that I, ALEXANDER OSBORN, of Eagleville, in the county of Ashtabula, and State of Ohio, have invented certain new and useful Improvements in Milk-Coolers and Deodorizing-Machines; and I do hereby declare that the following is a full and complete description of the same, reference being had to the accompanying drawings, making a part of this specification, in which—

Figure 1 is a side view of the apparatus.

Figure 2, a view of the top.

Figure 3, a detached section.

Like letters of reference refer to like parts in the several views shown.

This invention relates to a device for cooling the animal heat in milk, and extracting therefrom its peculiar odor, thereby preparing it for the cheese-vat.

In fig. 1—

A represents a frame, in which is hung a fan or blower, B, within the case C, and driven by the pulley D.

The mouth E of the blower opens into an ice-box, F, through which the wind from the fan passes to the spout G.

Immediately under the spout is a tub or cheese-vat, H, above which is supported, by the standards I, a chute, J, in such relative position to the vat as shown in the drawing, which, as will be seen, is at a considerable angle thereto.

It is a well-known fact to the manufacturers of cheese that the animal heat and odor in the milk just from the cow must first be removed, in order to make a good article of cheese. Also, that for an immediate use of the milk for that purpose, the heat and odor should be removed as speedily as practicable, and with as little agitation of the milk as possible.

To accomplish this, many expedients have been resorted to, most of which have been unsatisfactory in their results, for the reason of the great agitation to which the milk has been subjected, causing more or less separation of the butter from the milk, or when allowed to stand until cool, the cream sets, and thus seriously interferes with a good and immediate working up of the milk into cheese.

To avoid this difficulty is the purpose of this invention, the practical operation of which is as follows:

The fan or blower is made to revolve, thereby producing a current of air through the ice-box, from thence out of the spout G. At this time the fresh, warm milk is thrown into the tub, by first pouring upon the most elevated end of the chute, over which it spreads and flows down to the lower end, where it meets the current of air from the spout, which, by the action of the fan, is blown into the milk, as it falls from the end of the chute into the tub below, thereby rapidly cooling it, and, at the same time, by the fresh, strong draught of air, is carried off the animal odor, thus fitting the milk for immediate use.

Should the weather not be very warm, ice need not be used in the box through which the air is blown, the current of wind being sufficiently cool to reduce the milk to the required temperature and condition for working.

Should the milk require heating, in consequence of long standing or extreme cold weather, a hot blast can be blown into it, by converting the ice-box into a heater, and thereby save much time and expense in handling the milk, for heating it in a separate apparatus.

To facilitate the cooling of the milk in extreme warm weather, the close chute J is removed, and the perforated one, shown in fig. 3, put in place thereof, thereby causing a separation of the milk into numerous small streams, exposing it, by this means, to a more direct and intimate contact with the current of air from the blower.

The chute can be made adjustable, so that it may be depressed below the spout, and thereby allow the wind from the blower to be thrown upon the milk, as it flows down upon the chute, instead of striking it as it falls therefrom, into the vat, as above described.

The amount of air thrown upon the milk can be regulated by a damper, arranged in the spout, or by the speed of the fan.

What I claim as my invention, and desire to secure by Letters Patent, is—

1. The combination and arrangement of the blower B, chute J, perforated or not perforated, and vat H, in the manner substantially as described, and for the purpose set forth.

2. The ice-box F, when arranged in relation to the blower B, and in combination therewith, in the manner as and for the purpose described.

3. An arrangement of devices, consisting of the wind-current generators, and a chute or chutes, as will produce a blast or current of air upon falling milk, as specified.

ALEX. OSBORN.

Witnesses:
    J. H. BURRIDGE,
    FRANK S. ALDEN.